United States Patent
Keeney et al.

(10) Patent No.: US 7,302,103 B2
(45) Date of Patent: *Nov. 27, 2007

(54) APPARATUS AND METHODS FOR DIGITAL IMAGE COMPRESSION

(75) Inventors: Richard A. Keeney, Prior Lake, MN (US); Thor A. Olson, Minnetonka, MN (US)

(73) Assignee: Electronics for Imaging, Inc., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/361,434

(22) Filed: Feb. 23, 2006

(65) Prior Publication Data

US 2006/0140495 A1    Jun. 29, 2006

Related U.S. Application Data

(63) Continuation of application No. 09/821,104, filed on Mar. 29, 2001, now Pat. No. 7,027,655.

(51) Int. Cl.
*G06K 9/46* (2006.01)
*H04N 9/00* (2006.01)

(52) U.S. Cl. .................... 382/239; 382/243; 725/10
(58) Field of Classification Search ............... 382/239, 382/243; 375/240.08, 240.1; 725/9, 10, 725/14, 16
See application file for complete search history.

(56) References Cited

U.S. PATENT DOCUMENTS

| | | | |
|---|---|---|---|
| 3,507,988 A | 4/1970 | Holmes | |
| 4,028,725 A | 6/1977 | Lewis | |
| 4,348,186 A | 9/1982 | Harvey et al. | |
| 4,439,157 A | 3/1984 | Breglia et al. | |
| 4,568,159 A | 2/1986 | Baldwin | |
| 4,755,045 A | 7/1988 | Borah et al. | |
| 4,836,670 A | 6/1989 | Hutchinson | |

(Continued)

FOREIGN PATENT DOCUMENTS

EP    00240336    10/1987

(Continued)

OTHER PUBLICATIONS

Atsumi et al., "Lossy/lossless Region-of-Interest Coding Based on Set Partitioning in Hierarchical Trees," Proceedings 1998 Int'l Conf. Image Processing, 1:87-91, Oct. 1998.

*Primary Examiner*—Colin LaRose
(74) *Attorney, Agent, or Firm*—James Trosino

(57) ABSTRACT

Methods and systems for compression of digital images (still or motion sequences) are provided wherein predetermined criteria may be used to identify a plurality of areas of interest in the image, and each area of interest is encoded with a corresponding quality level (Q-factor). In particular, the predetermined criteria may be derived from measurements of where a viewing audience is focusing their gaze (area of interest). In addition, the predetermined criteria may be used to create areas of interest in an image in order to focus an observer's attention to that area. Portions of the image outside of the areas of interest are encoded at a lower quality factor and bit rate. The result is higher compression ratios without adversely affecting a viewer's perception of the overall quality of the image.

20 Claims, 4 Drawing Sheets

U.S. PATENT DOCUMENTS

| | | |
|---|---|---|
| 4,852,988 A | 8/1989 | Velez et al. |
| 5,103,306 A | 4/1992 | Weiman et al. |
| 5,333,212 A | 7/1994 | Ligtenberg |
| 5,592,226 A | 1/1997 | Lee et al. |
| 5,764,803 A | 6/1998 | Jacquin et al. |
| 5,896,176 A | 4/1999 | Das et al. |
| 5,909,240 A | 6/1999 | Hori |
| 6,144,772 A | 11/2000 | Garland et al. |
| 6,252,989 B1 | 6/2001 | Geisler et al. |
| 6,256,423 B1 | 7/2001 | Krishnamurthy et al. |
| 6,356,664 B1 | 3/2002 | Dunn et al. |
| 6,389,169 B1 | 5/2002 | Stark et al. |
| 6,476,873 B1 | 11/2002 | Maeng |
| 6,496,607 B1 | 12/2002 | Krishnamurthy et al. |

FOREIGN PATENT DOCUMENTS

| | | |
|---|---|---|
| EP | 00402954 | 12/1990 |
| EP | 00735773 | 10/1996 |

ORIGINAL IMAGE 10

AREAS OF INTEREST 12

Q-FACTOR MAP 50

APPARATUS AND METHODS FOR DIGITAL IMAGE COMPRESSION

REFERENCE TO RELATED APPLICATIONS

This application is a continuation of U.S. application Ser. No. 09/821,104, filed Mar. 29, 2001, now U.S. Pat. No. 7,027,655.

BACKGROUND

The present invention provides methods and systems for compression of digital images (still or motion sequences) wherein predetermined criteria may be used to identify a plurality of areas of interest in the image, and each area of interest is encoded with a corresponding quality level (Q-factor). In particular, the predetermined criteria may be derived from measurements of where a viewing audience is focusing their gaze (area of interest). Portions of the image outside of the areas of interest are encoded at a lower quality factor and bit rate. The result is higher compression ratios without adversely affecting a viewer's perception of the overall quality of the image.

The invention is an improvement to the common practice of encoding, compressing, and transmitting digital image data files. Due to the large size of the data files required to produce a high quality representation of a digitally sampled image, it is common practice to apply various forms of compression to the data file in an attempt to reduce the size of the data file without adversely affecting the perceived image quality.

Various well-known techniques and standards have evolved to address this need. Representative of these techniques is the JPEG standard for image encoding. Similar to JPEG, but with the addition of inter-frame encoding to take advantage of the similarity of consecutive frames in a motion sequence is the MPEG standard. Other standards and proprietary systems have been developed based on wavelet transforms.

These prior art techniques all transform the image samples into the frequency domain and then quantize and/or truncate the number of bits used to sample the higher frequency components. This step is typically followed by entropy encoding of the frequency coefficients. MPEG and JPEG use a discrete cosine transform on 8×8 pixel blocks to transform the image samples into the frequency domain while wavelet techniques use more sophisticated methods on larger areas of pixels.

The loss of information is introduced at the quantization or truncation step. All of the other steps are reversible without loss of information. The degree of quantization and truncation is controlled by the encoding system to produce the desired data compression ratio. Although the method of controlling the quantization and truncation varies from system to system, the concept is generalized by those working in the field to that of a quality, or "Q" factor. The Q factor is representative of the resulting fidelity or quality of the image that remains after this step.

In the JPEG standard, control of the Q factor is set almost directly by the user at the time of encoding. In most encoders, it is global to the entire image. An image encoded using a standard JPEG encoder will result in degradation which is uniform over the entire image. Regardless of the importance of a particular part of an image to a viewer, the JPEG encoder simply truncates the higher frequency coefficients to produce a smaller file size at the expense of image fidelity. Prior art JPEG image compression makes no provisions to include high level cognitive information in the compression process.

In the MPEG standard, the Q factor is controlled indirectly by the bit-rate control mechanism of the encoder. The user (or system requirements such as the bandwidth of a DVD player or Satellite channel) typically set the maximum bit rate. Due to the complex interaction of the inter-frame encoding and the hard to predict relationship between the Q factor used during compression and the resulting data file size, the bit rate control is typically implemented as a feed-back mechanism. As the bit rate budget for a sequence of frames starts to run low, a global Q factor is decreased, and conversely if the bit rate is under budget, the Q factor is increased.

The MPEG standard also makes provisions for block-by-block Q factor control. Typically this level of control is accomplished by a measurement of the "activity" level contained in the block. Blocks with more "activity" are encoded with higher Q factors. The activity level is usually a simple weighted average of some important frequency coefficients, or based on the difference (motion) from the previous frame in that portion of the image.

Wavelet system standards are just starting to emerge. Some of these standards make provisions for varying Q factors over the area of the image.

These prior art systems attempt to preserve the image data content according to those portions most important to the human visual system (or a simplified model of it). Such prior art systems typically have no ability to make higher level decisions based on image content such as recognizable objects and features.

Some research in higher level image content recognition has been undertaken. Systems have been demonstrated that are able to identify specific objects in a scene, and for example, recognize faces. The prior art in these areas, however, does not describe using this information to control compression.

Certain prior art systems provide for a viewer determined area of interest. For example, Lewis U.S. Pat. No. 4,028,725 provides a vision system where the resolution of the display is increased in the viewer's line of sight. Hori U.S. Pat. No. 5,909,240 describes block compression of a video image performed during recording of the image based on the camera operator's viewpoint, which is determined using an eye tracking device associated with the recording device. Weiman et al. U.S. Pat. No. 5,103,306 discloses a system of image encoding with variable resolution centered around a point responsive to a single viewer's eye gaze.

In all such prior art, the area of interest is limited to one area designated by one viewer. This works fine for the one viewer actually viewing the image, but other viewers, or even the same viewer re-watching the recorded scene may not always direct their viewpoint to the same single location.

In general, the prior art does not describe or suggest a system of image compression based on the ability to predict or determine multiple areas of interest and encode the areas of interest at a higher Q-factor. It would be advantageous to provide a system whereby encoding is based on area of interest classification using predetermined criteria such that higher Q-factors are assigned to the areas of interest. It would be further advantageous to provide a system whereby the predetermined criteria may be based on measurements of a viewing audience's eye gaze.

Of significant importance in being able to effectively include high quality image content that anticipates the variety of viewpoints various viewers may choose is the ability to determine multiple areas of interest and encode and compress the areas of interest at high quality, while improving the compression ratio. Corresponding methods and systems are provided.

SUMMARY

The present invention provides methods and systems for compression of digital images (still or motion sequences) wherein predetermined criteria may be used to identify a plurality of areas of interest in the image, and each area of interest is encoded with a corresponding quality level (Q-factor). In particular, the predetermined criteria may be derived from measurements of where a viewing audience is focusing their gaze (area of interest). In addition, the predetermined criteria may be used to create areas of interest in an image to focus an observer's attention to that area. Portions of the image outside of the areas of interest are encoded at a lower quality factor and bit rate. The result is higher compression ratios without adversely affecting a viewer's perception of the overall quality of the image.

In an illustrative embodiment of the invention, a digital image is displayed. Means are provided for identifying a plurality of areas of interest in the digital image. Identified areas of interest are encoded at a first quality level and unidentified areas of the image are encoded at a second and lower quality level than the identified areas. A quantization map (Q-Map) may be created based on the identified areas of interest. The encoding may then be performed based on the Q-Map. The digital image may be a single still frame or one digital image in a sequence of images in a digital motion picture. Areas of interest may be identified for each image in a sequence. Alternatively, areas of interest may be identified only for selected images in the sequence of images. In this instance, areas of interest for any remaining images in the sequence may be extrapolated from the identified areas of interest.

The areas of interest may be determined by displaying an image to a target audience and observing their eye-gaze. The means for identifying areas of interest may comprise, for example, one or more eye tracking mechanisms for tracking the eye gaze point of one or more viewers who view the image. Alternatively, the means for identifying areas of interest may comprise a pointing device for one or more viewers to designate the areas of interest on the displayed image.

The areas of interest may be identified by a single viewer or a group of viewers. The viewers may comprise a representative audience made up of people likely to view the image. A histogram may be used to determine the most popular areas of interest.

In an alternate embodiment, the areas of interest may be identified in real time during live transmission of the image. The digital image may be a spatially representative version of the image to be encoded. In a further embodiment of the invention, values may be assigned to each area of interest based on the amount of viewer interest in that area, first values being assigned to areas with higher interest and second values being assigned to areas of lower interest. Each area of interest is encoded at a quality level corresponding to the assigned value, the areas with the first values being encoded at higher quality levels than the areas with the second values.

Encoding of the areas of interest may be performed to provide a gradual transition in quality between an identified area of interest and an unidentified area. The encoding may be performed using a block discrete cosine transform ("DCT"). Using DCT, the quality level for blocks of pixels may be adjusted for the areas of interest through the use of a quantization scale factor encoded for each block of pixels. The quality levels of the unidentified areas may be adjusted downward by: (i) truncating one or more DCT frequency coefficients; (ii) setting to zero one or more DCT frequency coefficients; or (iii) otherwise discarding one or more DCT frequency coefficients, on a block by block basis. Alternatively, the encoding may be performed using a wavelet transform.

In an alternate embodiment of the invention, the quality level for the unidentified areas may be adjusted downward by pre-filtering the image using a spatial frequency filter prior to encoding. In a further embodiment, the identified areas of interest are sampled at a higher spatial resolution than the unidentified areas. The identified areas of interest may then be encoded in one or more additional data streams. The additional data stream(s) may be encoded at a first quality level, and a data stream which contains the unidentified areas may be encoded at a second quality level. In addition, the additional data stream(s) may be encoded using a first method, and a data stream containing the unidentified areas may be encoded using a second method.

The invention may be implemented so that the areas of interest can be identified while the image is in transit (e.g., while the image data is being transmitted from one location to another). Alternatively, the areas of interest may be identified while the image is partially displayed. Further, the quality level of the unidentified areas of the image may be reduced for security purposes. The invention can be implemented to maintain a constant bit rate or a constant compression ratio.

In a further embodiment of the invention, the identified areas of interest are transmitted according to level of interest, so that areas with a higher level of interest are transmitted first, with successively lower interest level areas transmitted successively thereafter. The image can then be built up as it is received starting with the areas of highest interest. The invention can also be used to record statistical data regarding the identified areas of interest. Identified areas of interest from multiple images may be statistically recorded. The multiple images can be from multiple sources.

The invention can be implemented such that the quality levels of certain image areas are enhanced in order to artificially create areas of interest so that, for example, a viewer's attention will be drawn to the artificially created area(s) of interest. These artificially enhanced areas may consist of image areas containing a product, a name of a product, or any other portion of the image which it would be desirable to enhance.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

The present invention provides methods and systems for compression of digital images (still or motion sequences) wherein predetermined criteria may be used to identify a plurality of areas of interest in the image, and each area of interest is encoded with a corresponding quality level (Q-factor). In particular, the predetermined criteria may be derived from measurements of where a viewing audience is focusing their gaze (area of interest). In addition, the predetermined criteria may be used to create areas of interest in an image to focus an observer's attention to that area. Portions of the image outside of the areas of interest are encoded at a lower quality factor and bit rate. The result is higher compression ratios without adversely affecting a viewer's perception of the overall quality of the image.

The invention provides for an improved compression ratio achieved at a given perceived quality level when encoding and compressing digital images. This is accomplished by budgeting higher Q factors for multiple portions of the image (identified areas of interest), and lower Q factors for other portions of the image (unidentified areas). The invention is advantageous where the data for a digital motion picture is to be transmitted from a central location and stored on multiple (e.g., many hundreds) of servers across the country or around the world. In such a distribution scenario, it is advantageous to spend considerable time and effort to achieve the best possible compression ratio for a given image quality to reduce the transmission time and the cost of the storage space on the remote servers.

Figure 1:
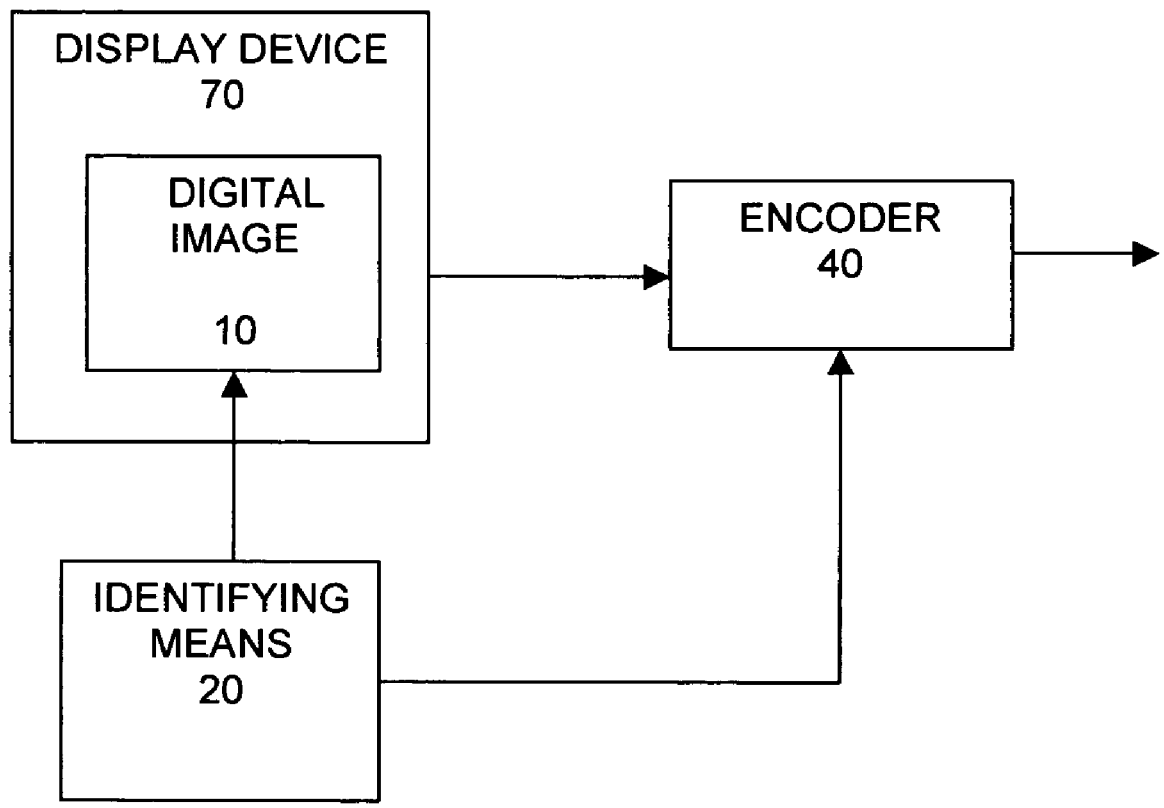
FIG. 1 shows a block diagram of a simplified exemplary embodiment of the invention.

In a simplified illustrative embodiment as shown in FIG. 1, a digital image 10 is displayed on a display device 70. Means 20 are provided for identifying one or more areas of interest in the digital image 10. Information relating to the identified areas of interest are provided to an encoder 40, along with the digital image data. The encoder 40 encodes the identified areas of interest of the image at a first quality level and encodes the unidentified areas of the image at a second and lower quality level than the identified areas. The encoded image data may then be stored or transmitted to theaters for storage and display.

Figure 2:
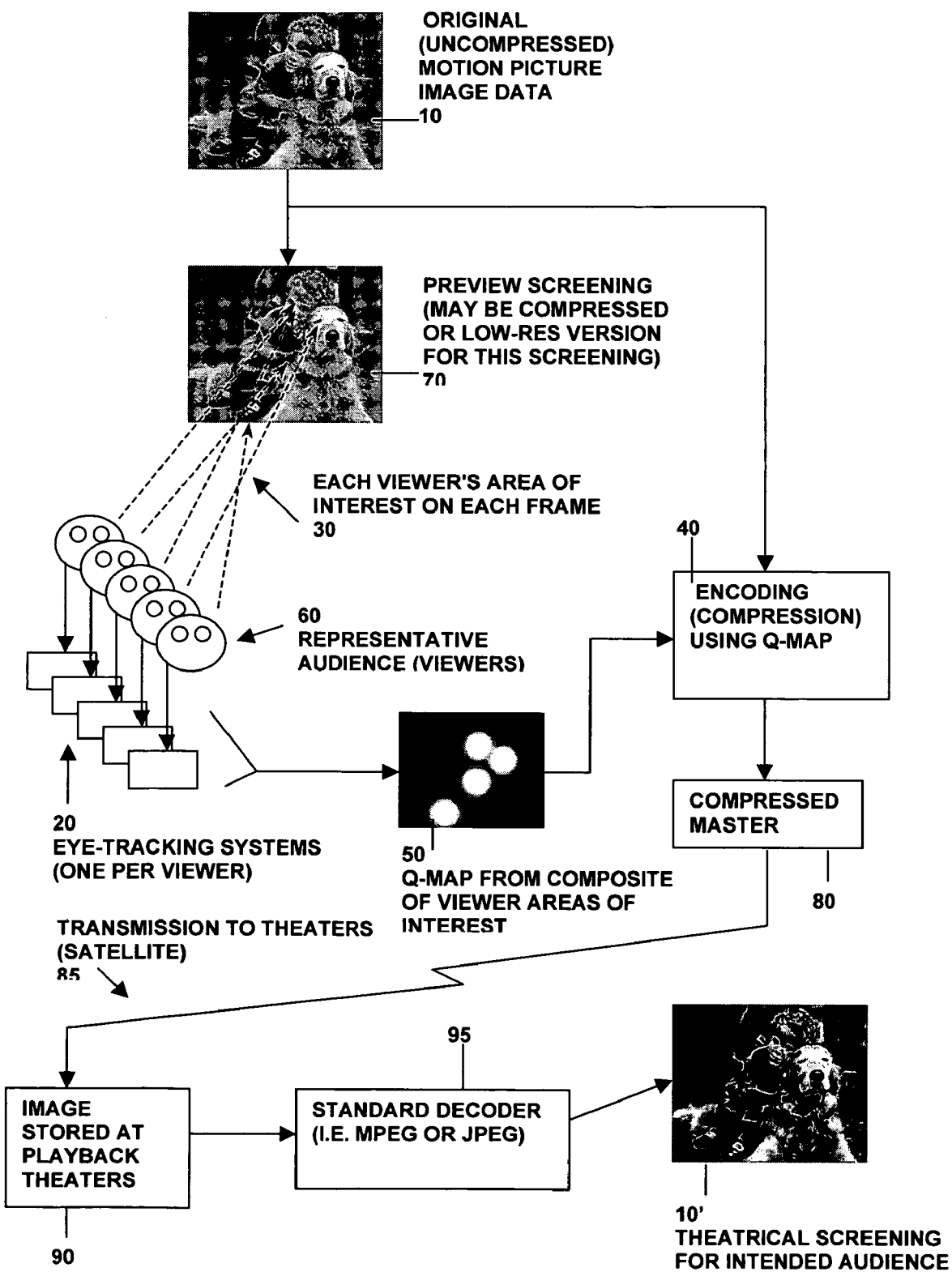
FIG. 2 shows a block diagram of a further exemplary embodiment of the invention.

In an illustrative embodiment of the invention as shown in FIG. 2, a digital image 10 is displayed (previewed) on a display device 70. Means 20 are provided for identifying one or more areas of interest in the digital image. Identified areas of interest are shown at 30. At an encoding device 40, the identified areas of interest (as shown at 30) are encoded at a first quality level and unidentified areas of the image are encoded at a second and lower quality level than the identified areas.

In the example shown in FIG. 2, encoder 40 creates a compressed master copy 80 of image 10, with identified areas of interest 30 encoded at a higher quality level than the unidentified areas of image 10. The master copy of image 80, which may be a series of images comprising a digital motion picture, may be, for example, transmitted to theaters via satellite as shown at 85. The compressed master copy of the image (or motion picture) may be stored for playback at multiple theaters 90. A standard decoder 95 (e.g., a standard JPEG or MPEG decoder) can then be used to decode the stored master copy to produce an image 10' for viewing by the intended audience.

A Q-Map 50 may be created based on the areas of interest identified during the identifying step. Q-Map 50 provides information to encoder 40 regarding which areas of image 10 have been identified as areas of interest 30. The encoding 40 may then be performed based on Q-Map 50, such that the identified areas of interest 30 are encoded at a higher quality level than unidentified areas of image 10.

Figure 3:
FIG. 3 shows details of the creation of a Q-Map in accordance with the invention.
Figure 3:
Figure 3:
Figure 3:
Figure 3:
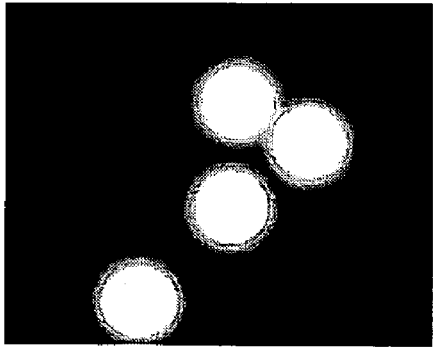

FIG. 3 illustrates an exemplary formation of Q-Map 50. Image 10 is viewed by an observer or multiple observers who designate one or more areas of interest as shown at 12. The locations of these areas of interest 12 are used to create Q-Map 50 (e.g., in software). For example, Q-Map 50 may be added to the internal Q-Map utilized by an MPEG encoder. Although adding Q-Map 50 to the internal Q-Map of an MPEG encoder may result in a slight increase in the bit rate, the bit rate feedback mechanism will compensate by reducing the overall Q factor used.

Digital image 10 may be a single still frame or one digital image in a sequence of images in a digital motion picture.

Areas of interest 30 may be identified for each image 10 in a sequence. Alternatively, areas of interest 30 may be identified only for selected images in the sequence of images. In this instance, areas of interest 30 for any remaining images in the sequence are extrapolated from the identified areas of interest 30.

As shown in FIG. 2, the means for identifying areas of interest 20 may comprise one or more eye tracking mechanisms for tracking the eye gaze point of one or more viewers 60 as the one or more viewers 60 view image 10. Such tracking mechanisms allow for passive participation on the part of the viewers 60. Viewers 60 would then only need to view image(s) 10 or the motion picture sequence as they normally would.

Many eye tracking systems have been described in the prior art, and suitable eye tracking systems are also commercially available, for example the Imagina Eyegaze Eye-tracking System marketed by LC Technologies, Inc. of Fairfax, Va. These systems have been used in the past for applications such as allowing disabled people to communicate and use computers, as well as academic studies of the psychology of visual perception, studies of the psychology of visual tasks, and other related areas.

Measuring the area of interest information for multiple viewers 60 can be accomplished either by having the multiple viewers 60 view the images 10 one at a time on a single eye-tracking equipped display system, by having multiple systems, one for each viewer, or by a single display system with multiple eye-tracking inputs, one for each viewer. FIG. 2 shows multiple eye tracking mechanisms 20 for use by multiple viewers 60 simultaneously viewing the image 10, which results in several identified areas of interest 30.

Alternatively, means 20 for identifying areas of interest 30 may comprise a pointing device for one or more viewers 60 to designate the areas of interest 30 on image 10. For still images 10, pointing can be accomplished with devices such as a digitizing tablet with a hard copy of image 10 placed on it. For moving images or for more convenience, a mouse-controlled cursor on an electronic display of image 10 can be utilized. The pointing may be done with images 10 displayed one at a time or slower than real time. Additionally, the pointing may only need to be done on key frames with the areas of interest for the remaining frames being interpolated.

Those skilled in the art will recognize that many alternative methods and devices are available for determining the areas of interest. For example, area of interest determination may be based on empirical measurements of eye-gaze, predictions of areas of interest based on historic eye-gaze data, predictions of area of interest based on pattern matching, or other suitable criteria. Viewers may verbally describe the areas of interest to a system operator, who enters the area of interest information into the system using, e.g., a pointing device or other suitable means to enter the information into the system. Eye gaze of a viewer or group of viewers may be noted by one or more additional people watching the viewer(s), who are then able to enter this information into the system. Viewers can be presented with several versions of the image, each version having different predetermined areas of interest, such that the viewers can choose a version of the image that they prefer. Software capable of object recognition may be used to determine common predefined areas of interest, such as faces, eyes, and mouths in close-up views of people in the image, hands or any implements contained in the hands, the area of the image towards which people in the image are looking, the area of the image towards which movement in the image is directed, the center of the image, any objects of importance in the image, and the like. Any other suitable means may also be used to determine or identify areas of interest.

Further, those skilled in the art will recognize that although the invention is described in terms of identifying areas of interest, the invention can be implemented so that areas of non-interest are identified. These areas of non-interest can be encoded at a lower quality level than the other areas of the image. For example, it may be desirable to identify corners or extreme edges of the image as areas of non-interest so that they are encoded at a lower quality level than the remainder of the image. Similarly, background scenes may be identified as areas of non-interest and encoded at lower quality levels than the remainder of the image.

Because the digital image data (e.g., motion picture data) to be transmitted can be prepared several days in advance, it is possible to preview 70 image 10 in front of a representative audience of viewers 60 and gather their area of interest information in a statistical manner.

In a preferred embodiment, areas of interest 30 may be identified by a single viewer or a group of viewers. The viewers may comprise a representative audience 60 made up of people likely to view image 10. The representative audience 60 should be a reasonable statistical sample of the intended target audience that will view the image (e.g., at a theater). To collect information on multiple areas of interest 30, the representative audience 60 should be comprised of a sufficient number of viewers. In the preferred embodiment, the minimum preview audience size would be ten viewers. The maximum preview audience size is limited by the logistics and costs associated with gathering the area of interest information, typically on the order of 20 to 50 viewers.

A histogram may be used to determine the most popular areas of interest 30. By having a statistical sample of typical viewers, and of their multiple areas of interest for each image frame, there is a very high probability that their preferences in terms of areas of interest will encompass the preferences of most of the general audience most of the time.

The shape of the histogram helps determine how many areas of interest need to be identified in each image 10. If there is one clear maximum in the histogram, then only one area of interest 30 needs to be used. If there are multiple peaks, then multiple areas of interest 30 need to be used. In scenes such as a wide shot with no specific areas of interest, the histogram will have no discernable peaks. In this case, image 10 can be encoded without any specific enhanced areas and the bits will be budgeted uniformly over the area of image 10.

In an alternate embodiment, the areas of interest 30 may be identified in real time during a live transmission of image 10. There may be additional steps required to transmit the area of interest information back to the originating encoding site. Also, because the area of interest for a subsequent frame may be based on the viewers' attention on the currently displayed frame, there may be some lag in the tracking of areas of interest 30 as they move around. This lag can be significant if the round trip transmission of the compressed image data and/or area of interest information is via a satellite link for example. If size of the area encoded at the higher Q factor is made large enough, adverse effects of this lag can be somewhat mitigated for many situations.

When the lag time is short, it is possible to present the perception of a high quality image everywhere. Especially when there are a small number of viewers, the image areas receiving the higher quality encoding can dynamically track the area of the viewers' attention. The area outside of the viewers' central area of foveal vision (visual axis which affords acute or high-resolution vision) does not contribute to the perceived resolution of the image. This can be utilized in systems where the image is encoded at full resolution everywhere, but the bandwidth of the playback device does not permit it to be displayed at full resolution.

Dynamic tracking of the area of interest 30 can also be used for presentation purposes where the presenter uses a pointing device or other means to select an area that is of particular interest for instructing or informing an audience.

For purposes of a displaying (previewing) image 10 on display device 70, the displayed image at 70 may be a spatially representative version of image 10 to be encoded. For the purposes of displaying image 10 for preview screening at 70, image 10 may optionally be sub-sampled or conventionally compressed using the well known techniques of the prior art for convenience of screening the preview. A simple video transfer and presentation on a video monitor, for example, will suffice for the preview process.

In a further embodiment of the invention, values may be assigned to each area of interest 30 based on the amount of viewer interest in that area, first values being assigned to areas with higher interest and second values being assigned to areas of lower interest. Each area of interest is encoded at a quality level corresponding to the assigned value, the areas with the first values being encoded at higher quality levels than the areas with the second values.

Encoding 40 of the areas of interest 30 may be performed to provide a gradual transition in quality between an identified area of interest and an unidentified area. In other words, to avoid introducing distracting artifacts due to a "seam" in the image where the Q factor changes, the change should be gradual. This concept is already included in many MPEG encoders, for example, by filtering or "smoothing" the block-by-block Q factors.

Encoding 40 may be performed using a block DCT, in which the quality level for blocks of pixels may be adjusted for the areas of interest through the use of a quantization scale factor encoded for each block of pixels. The quality levels of the unidentified areas may be adjusted downward by: (i) truncating one or more DCT frequency coefficients; (ii) setting to zero one or more DCT frequency coefficients; or (iii) otherwise discarding one or more DCT frequency coefficients, on a block by block basis.

In the case of file formats such as MPEG that already have variable Q factor control over the area of the image, the block-by-block Q factor control portion of encoder 40 can be modified to incorporate the area of interest data (e.g., from the Q-Map). Although the JPEG file standard does not provide for block-by-block Q factor control, a JPEG encoder could be modified to have the ability to do additional truncation or filtering of the high frequency coefficients on a block-by-block basis. Encoder 40 will then be able to achieve high compression ratios for those portions of the image due to its ability to efficiently encode these smaller (or zero) values in its entropy encoding stage.

In addition, the encoding may be performed using a wavelet transform. Those skilled in the art will appreciate that other image compression systems may also be suitable for use with the invention. Alternatively, it may be desirable to develop a non-standard format or an extension to a standard format to specifically allow spatially-varying Q factor encoding.

Further, the image 10 can be encoded as several layers, each contained in a standard or non-standard file or bitstream format. The base layer would contain the lowest level of detail. The additional enhancement layer(s) would contain difference information from the base layer to further refine it in the areas of interest. The areas not of interest in the enhancement layer would be completely blank, and would compress at a very high ratio. For example, the base layer could be sampled at 2 k while the enhanced layer is at a higher resolution of 4 k.

Figure 4:
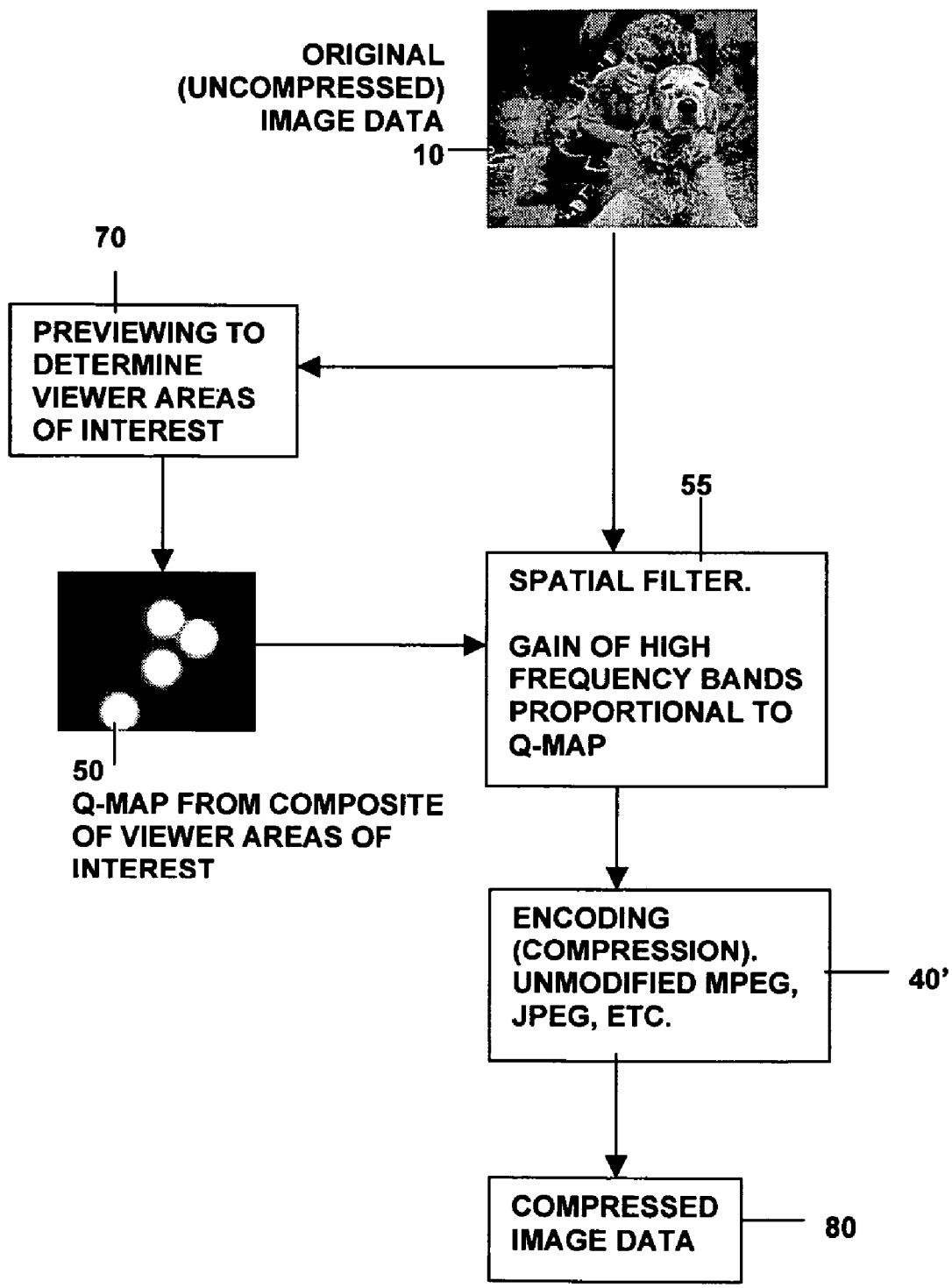
FIG. 4 shows a block diagram of an alternate embodiment of the invention.

In an alternate embodiment of the invention as shown in FIG. 4, the quality level for the unidentified areas may be adjusted downward by pre-filtering the image using a spatial frequency filter 55 prior to encoding. In this embodiment, image 10 is previewed and areas of interest are identified as discussed above in connection with FIG. 2. Q-Map 50 is created based on the identified areas of interest. Q-Map 50 is used to control the spatial frequency filter 55 (e.g., a variable low-pass spatial frequency filter). Attenuation or spatial frequency cut-off, or both, may be controlled by Q-Map 50. Higher Q factors would raise the gain of the higher frequency components or raise the spatial frequency cutoff to higher spatial frequencies, preserving more details in the image. Lower Q factor portions of Q-Map 50 would cause filter 55 to attenuate the higher spatial frequencies more and the details in those images would appear blurry.

The output of spatial frequency filter 55 is input into a standard encoder 40' (e.g., a standard MPEG, JPEG, or other lossy compression encoder). Due to the way in which such image compression encoders work, the portions of the image that have been pre-filtered by filter 55 will result in fewer output bits in output compressed image data 80. Compressed data 80 can be transmitted and/or stored as discussed in connection with FIG. 2.

Thus, when an unmodified encoder 40' is to be used, image data 10 can be pre-filtered 55 to selectively remove detail from the unidentified areas. The filtered areas will contain less (or perhaps zero) information in the higher frequencies. Standard encoder 40' will be able to achieve high compression ratios for those portions of the image due to its ability to efficiently encode these smaller (or zero) values in its entropy encoding stage. Therefore, the actual encoding of the image data can remain in an industry standard format such as JPEG or MPEG. As such, the resulting file can be decoded or viewed using a standard (unmodified) decoder or viewer for that file format.

In a further embodiment, identified areas of interest 30 are sampled at a higher spatial resolution than the unidentified areas. Identified areas of interest 30 may then be encoded in one or more additional data streams. The additional data stream(s) may be encoded 40 at a first quality level, and a data stream which contains the unidentified areas may be encoded at a second quality level. In addition, the additional data stream(s) may be encoded using a first method, and a data stream containing the unidentified areas may be encoded using a second method.

The invention may be implemented so that areas of interest 30 can be identified while image 10 is being transmitted from one location to another. For example, instead of previewing the image and recording the areas of interest, the image may be viewed "live" and the areas of interest are encoded while the image is being transmitted. The viewers could be located at the transmitting location or the destination location provided there is a return path for the area of interest information. Alternatively, the areas of interest may be identified while the image 10 is partially displayed, e.g., at low resolution, such as progressive JPEG images viewed on the world wide web. For example, areas of interest can be measured while viewers view the low resolution image, and these areas can be encoded and transmitted with a higher quality level. Further, the quality level of the unidentified areas of the image may be reduced for security purposes.

The invention can be implemented to maintain a constant bit rate or a constant compression ratio. In a further embodiment of the invention, identified areas of interest 30 are transmitted according to level of interest, so that areas with a higher level of interest are transmitted first with successively lower interest level areas transmitted successively thereafter. Image 10 can then be built up as it is received starting with the areas of highest interest.

The invention can also be used to record statistical data regarding identified areas of interest 30. Identified areas of interest 30 from multiple images 10 may be statistically recorded. Images 10 can be from multiple sources.

The invention can be implemented such that the quality levels of certain image areas are enhanced to artificially create areas of interest. The enhanced areas may consist of image areas containing a product, a name of a product, or any other portion of the image which would be desirable to enhance.

The increase in compression ratio is directly related to the portion of the image that is encoded at the lower Q factor (non areas of interest), and how much lower that Q factor is. Taken to an extreme, the method described herein would adversely affect image quality as viewers get distracted from the areas of interest by compression artifacts appearing and moving around in the unidentified areas of the image. Good performance is generally achieved when the Q factor for the non-enhanced portion of the image is high enough to not have any obvious artifacts (such as DCT blocks showing, loss of grain, or drastic color banding). The enhanced portion is encoded with the remaining bit budget.

As an example, typical images viewed in a wide-screen movie presentation may require areas of interest covering 20 to 40% of the image area. If these areas are encoded at a Q factor (bit rate) sufficient to meet the desired quality level and the remainder is encoded at half the bit rate, a 30 to 40% savings in data size is achieved compared to encoding the entire image at the higher Q factor.

The size of the areas of interest should be large enough to encompass the viewers fovea (central high-resolution portion of the eye). Combining the angular coverage of the human fovea with the anticipated maximum viewing distance yields the diameter of the circles of the enhancement area required.

FIGS. 2-4 show the areas of interest on the Q-Map 50 as circular. Alternate shapes for the areas of interest 30 may be non-circular. For example, the areas may be made elliptical with the long axis along the direction of travel of each area of interest as it is tracked from frame to frame, which helps compensate for lags in a live broadcast. Additionally, the shape of the areas of interest 30 may be expanded to the extent of objects detected in the image or to the extent of similar texture so that the seams in the Q-Map fall on seams in the image. When multiple areas of interest 30 are close to each other, the areas of enhancement may be combined into one area with perhaps a slightly larger size.

It will now be appreciated that the present invention provides an improved method and system for digital image compression, wherein a plurality of identified areas of interest are encoded at a high quality level and unidentified areas are encoded at a lower quality level, while maintaining perceived image quality.

The foregoing merely illustrates the principles of this invention, and various modifications can be made by persons of ordinary skill in the art without departing from the scope and spirit of this invention.

The invention claimed is:

1. A method of digital image compression, the method comprising:
   identifying a plurality of areas of interest in a sequence of related images, wherein a size of the identified areas of interest corresponds to an angular coverage of an average human fovea at a predetermined viewing distance;
   using a histogram to determine most popular identified areas of interest, wherein the most popular identified areas of interest comprise less than all of the plurality of identified areas of interest; and
   encoding the most popular identified areas of interest at a first quality level and unidentified areas of the image at a second and lower quality level than the most popular identified areas to produce a single compressed copy of each image which can be decoded at a decoder.

2. The method of claim 1, further comprising creating a quantization map based on the identified areas of interest, wherein the encoding is performed based on the quantization map.

3. The method of claim 1, wherein the sequence of related images comprises a digital motion picture.

4. The method of claim 1, wherein the encoding is performed to provide a gradual transition in quality between an identified area of interest and an unidentified area.

5. The method of claim 1, wherein the quality level for the unidentified areas is adjusted downward by pre-filtering the image with a spatially varying spatial frequency filter prior to encoding.

6. The method of claim 1, wherein the areas of interest are identified while the image is partially displayed.

7. The method of claim 1, wherein the identified areas of interest are transmitted according to level of interest, so that areas with a higher level of interest are transmitted first with successively lower interest level areas transmitted successively thereafter.

8. The method of claim 1, further comprising enhancing the quality levels of certain unidentified areas to create additional areas of interest to draw a viewer's attention to the additional areas of interest.

9. The method of claim 8, wherein the additional areas of interest are image areas containing at least one of a product and a name of a product.

10. The method of claim 1, wherein encoding comprises encoding using a block discrete cosine transform.

11. A system for digital image compression, the system comprising:
    means for a group of viewers to identify a plurality of areas of interest in a sequence of related images provided by a display, wherein a size of the identified areas of interest corresponds to an angular coverage of an average human fovea at a predetermined viewing distance;
    means for using a histogram to determine most popular identified areas of interest, wherein the most popular identified areas of interest comprise less than all of the plurality of identified areas of interest; and
    an encoder adapted to encode the most popular identified areas of interest at a first quality level, and unidentified areas of the image at a second and lower quality level than the most popular identified areas to produce a single compressed copy of each image that can be decoded at a decoder.

12. The system of claim 11, further comprising a quantization map created based on the identified areas of interest, wherein the encoding is performed based on the quantization map.

13. The system of claim 11, wherein the sequence of related images comprises a digital motion picture.

14. The system of claim 11, wherein the encoding is performed to provide a gradual transition in quality between an identified area of interest and an unidentified area.

15. The system of claim 11, further comprising a spatially varying spatial frequency filter, wherein the quality level for the unidentified areas is adjusted downward by pre-filtering the image using the spatial frequency filter prior to encoding.

16. The system of claim 11, wherein the areas of interest are identified while the image is partially displayed.

17. The system of claim 11, wherein the identified areas of interest are transmitted according to level of interest, so that areas with a higher level of interest are transmitted first with successively lower interest level areas transmitted successively thereafter.

18. The system of claim 11, wherein the quality levels of certain unidentified areas are enhanced to artificially create additional areas of interest from the certain unidentified areas in order to draw a viewer's attention to the additional areas of interest.

19. The system of claim 18, wherein the additional areas of interest are image areas containing at least one of a product and a name of a product.

20. The system of claim 11, wherein the encoder performs encoding using a block discrete cosine transform.

* * * * *